United States Patent [19]

Inoue et al.

[11] Patent Number: 5,070,355
[45] Date of Patent: Dec. 3, 1991

[54] CAMERA SYSTEM CAPABLE OF RECORDING INFORMATION IN AN EXTERNAL MEMORY

[75] Inventors: Manabu Inoue; Nobuyuki Taniguchi; Katsuyuki Nanba; Yoshinobu Kudo; Michihiro Iwata; Shigeru Wada, all of Osaka, Japan

[73] Assignee: Minolta Camera Kabushiki Kaisha, Osaka, Japan

[21] Appl. No.: 524,808

[22] Filed: May 18, 1990

[30] Foreign Application Priority Data

May 22, 1989 [JP] Japan .................................. 1-126597

[51] Int. Cl.⁵ .............................................. G03B 7/00
[52] U.S. Cl. .................................. 354/413; 354/145.1; 354/106
[58] Field of Search ........................ 354/413–424, 354/149.1, 149.11, 145.1, 137, 105, 106

[56] References Cited

U.S. PATENT DOCUMENTS

| | | |
|---|---|---|
| 4,051,494 | 9/1977 | Fujita et al. |
| 4,285,588 | 8/1981 | Mir ........................................ 354/137 |
| 4,500,183 | 2/1985 | Tanikawa . |
| 4,728,978 | 3/1988 | Inoue et al. . |
| 4,978,989 | 12/1990 | Nakano et al. .......................... 354/413 |

Primary Examiner—Russell E. Adams
Attorney, Agent, or Firm—Burns, Doane, Swecker & Mathis

[57] ABSTRACT

A camera capable of identifying photographing conditions causative of red-eye effect making the eyes of human pictures in a flash-photographed picture come out red, and recording the identified photographing conditions in an external memory provided on a film cartridge loaded thereon. The camera recognizes the possibility of occurrence of red-eye effect on the basis of the focal length of the camera lens, the object distance, the distance between the optical axis of the camera lens and the light source of the flash light device and the object brightness. When the photographing conditions are identified to be causative of red-eye effect, a warning is displayed and flash photographing is forbidden. When photographing operation is carried out under photographing conditions liable to cause red-eye effect, information about the exposed film including the photographing conditions is recorded in the external memory to enable the subsequent developing and printing processes to correct the photograph with reference to the information.

6 Claims, 8 Drawing Sheets

FIG. 6

| D \ f | 35mm | 50mm | 70mm | 105mm |
|---|---|---|---|---|
| 0.7m | × | × | × | × |
| 1m | × | × | × | × |
| 1.4m | ○ | ○ | ○ | ○ |
| 2m | ○ | ○ | ○ | ○ |
| 2.8m | ○ | ○ | ○ | ○ |
| 4m | × | ○ | ○ | ○ |
| 5.6m | × | × | ○ | ○ |
| 8m | × | × | × | ○ |

FIG. 7

| DISTANCE d (FLASH-LENS) | 60mm | | 70mm | |
|---|---|---|---|---|
| D \ f | 35mm | 50mm | 70mm | 105mm |
| 0.7m | × | × | × | × |
| 1m | × | × | × | × |
| 1.4m | ○ | ○ | × | × |
| 2m | ○ | ○ | ○ | ○ |
| 2.8m | ○ | ○ | ○ | ○ |
| 4m | × | ○ | ○ | ○ |
| 5.6m | × | × | ○ | ○ |
| 8m | × | × | × | ○ |

CAMERA SYSTEM CAPABLE OF RECORDING INFORMATION IN AN EXTERNAL MEMORY

BACKGROUND OF THE INVENTION

1. Field of the Invention

The present invention relates to a camera system capable of recording photographing information and, more particularly, to a camera system capable of identifying photographing conditions which cause red-eye effect in a flash photographing mode and capable of recording information about the photographing conditions as data for developing in an external memory.

2. Description of the Prior Art

A color portrait of red-eyed human picture is taken in some cases when a flash light device is used for photographing a picture. Red-eyed picture is taken when a flash light is too close to a camera lens, and nearly level with a photographed person's eye. The unnatural, glowing red of the eyes are due to internal reflections from the vascular membrane behind the retina, which is rich in blood vessels. In black and white photography, that condition produces unusually light pupils. Such an effect is called red-eye effect.

It has empirically been confirmed that red-eye effect is liable to occur when the angle $\theta$ between the line LE and the line FE of a triangle LEF shown in FIG. 9, where L is the camera lens, E is the object (the eye) and F is the light source of the flash light device, is smaller than 2°-2.5°. Red-eye effect is not conspicuous when the object is small, and red-eye effect does not occur when the object is in the bright light because the iris of the eye is contracted in the bright light.

On the basis of such knowledge, a camera with a built-in flash light device designed so as to dispose the light source of the flash light device at a distance (d) greater than a predetermined distance from the optical axis of the camera lens is proposed in U.S. Pat. No. 4,051,494 and a camera designed so as to shift the flash light device relative to the camera lens to increase the distance (d) in a flash photographing mode is proposed in Japanese Patent Publication No. 58-20021.

This known method of preventing red-eye effect by increasing the distance between the camera lens and the flash light device, however, is unable to prevent red-eye effect perfectly and, under some photographing conditions, the flash light device must be withheld from operation to prevent red-eye effect, inevitably causing underexposure. When the object is in the dark, the flash light device must be used regardless of unavoidable red-eye effect.

SUMMARY OF THE INVENTION

Accordingly, it is a principal object of the present invention to provide a camera system capable of recognizing the possibility of occurrence of red-eye effect before photographing based on photographing conditions.

It is another object of the present invention to provide a camera system capable of changing photographing conditions when the photographing conditions is possible to cause red-eye effect.

It is a further object of the present invention to provide a camera system capable of recording information about the photographing conditions as data for developing the photographic image of an object affected by red-eye effect in a satisfactory photographic image on a film.

Other objects and features of the inveniton will become apparent from the following description taken in connection with the accompanying drawings.

BRIEF DESCRIPTION OF THE DRAWINGS

FIG. 6 is a first example of red-eye effect estimation table for identifying photographing conditions possible to cause red-eye effect;

FIG. 7 is a second example of red-eye effect estimation table for identifying photographing conditions possible to cause red-eye effect;

DETAILED DESCRIPTION OF THE PREFERRED EMBODIMENT

Figure 1:
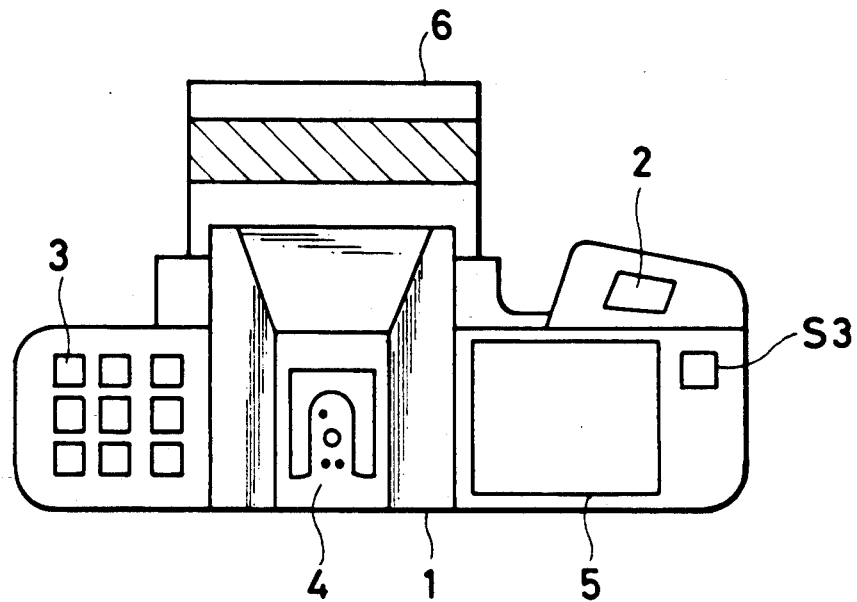
FIG. 1 is a top plan view of a camera in a preferred embodiment according to the present invention.
Figure 2:
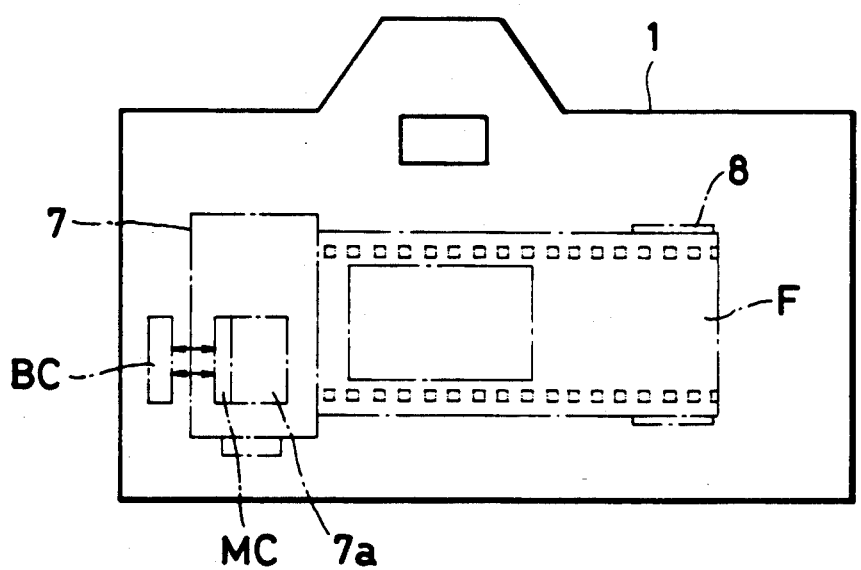
FIG. 2 is a back view of the camera of FIG. 1.

A camera embodying the present invention will be described hereinafter with reference to the accompanying drawings. Referring to FIGS. 1 and 2, a shutter release button 2 provided on a camera body 1 is depressed to a first position to close a light measuring switch S1, and is further depressed to a second position to close a shutter release switch S2. The camera is provided with key switches 3 for setting information including photographing conditions, a flash light device shoe 4 for holding a flash light device and for electrically connecting the flash light device to the camera, a display unit 5 for displaying photographing conditions, a flash photographing forbidding switch S3, and a camera lens 6.

A film cartridge 7 is provided with a read/write memory 7a capable of storing information about photographing conditions for each frame of the film and capable of allowing reading the information about photographic conditions therefrom. The memory 7a has an electrical terminal MC which is brought into electrical contact with an electrical terminal BC provided on the camera body 1 when the film cartridge 7 is loaded into the camera body 1. The terminals MC and BC have a plurality of contact points. A control circuit provided on the camera body 1 sends signals through the electrical terminals MC and BC to the memory 7a to control the memory 7a for writing information in and reading the same from the memory 7a. Indicated at 8 is a winding spool and at F is a film.

Figure 3:
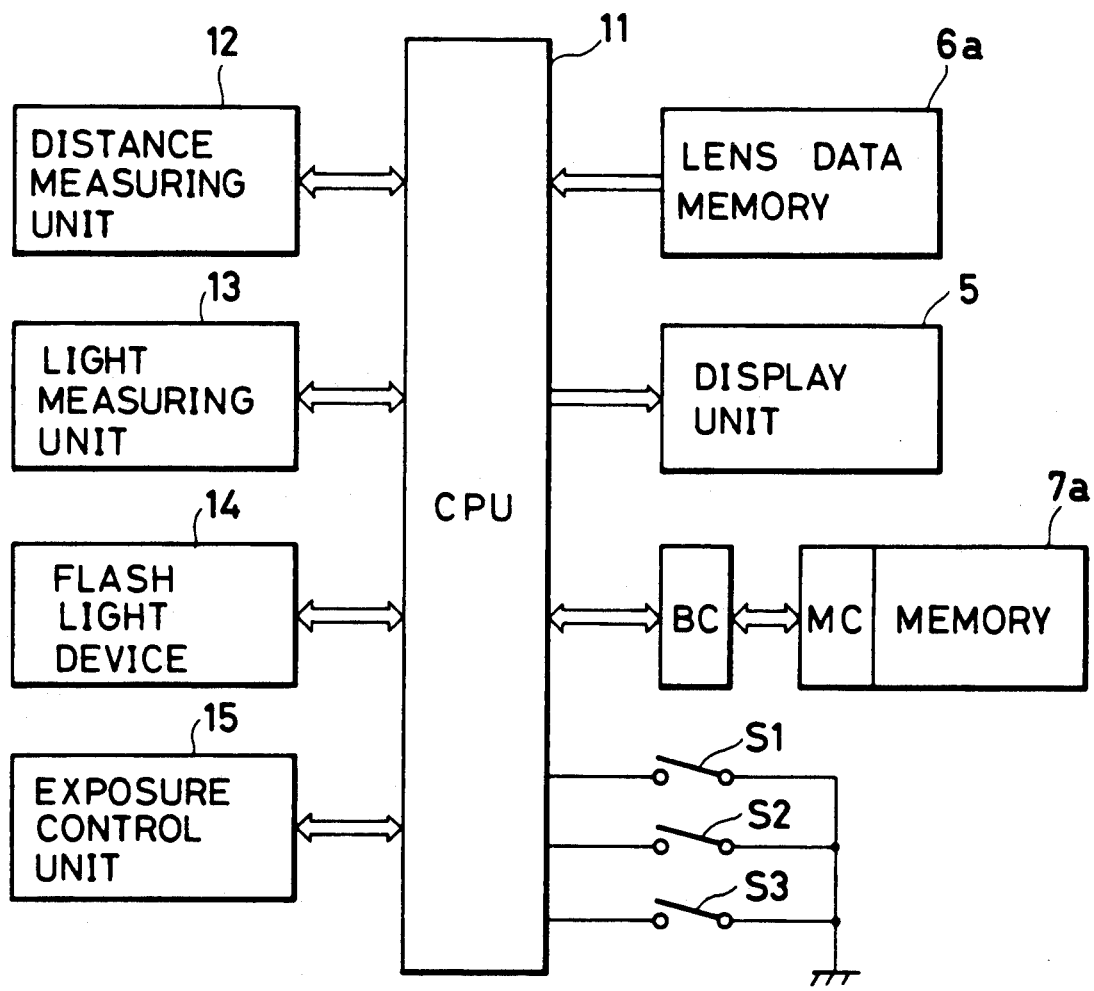
FIG. 3 is a block diagram of a control circuit incorporated into the camera of FIG. 1.

Referring to FIG. 3 showing the control circuit, there are shown a central processing unit (hereinafter, abbreviated to "CPU") 11, i.e., a microprocessor, a distance measuring unit 12, a light measuring unit 13, a flash light device 14, and an exposure control unit 15. These components are known devices. A lens data memory 6a is incorporated into the camera lens 6. Data of the camera lens 6 including the focal length is stored in the lens data memory 6a. The display unit 5 comprises display elements such as liquid crystal display elements. The flash light device 14 may be a detachable flash light device or a flash light device built in the camera body 1.

The control operation of the control circuit will be described with reference to FIGS. 4(a) and 4(b). The control circuit is initialized upon the connection of the same to a power supply before starting the control operation. Then, in step #1, a query is made to see whether or not the light measuring switch S1 is ON. When the result is negative, the control circuit remains in a standby state. When the result in step #1 is affirmative, the CPU 11 reads the data of the camera lens 6 from the lens data memory 6a in step #2, and executes exposure calculation in step #5 to determine exposure data by using data measured by the light measuring unit 13 and the distance measuring unit 12 in steps #3 and #4.

When the flash light device 14 is connected to a power supply, exposure control data for a flash photographing mode including a shutter speed and an aperture, and flash light device control data including a corrected quantity of flashlight are determined by the exposure calculation in step #5. When the flash light device 14 is disconnected from the power supply or flash light device 14 is not connected to the camera body 1, the CPU 11 determines exposure control data for a natural photographing mode. The exposure control executed by CPU 11 may be constructed for an automatic flash photographing so as to decide on the basis of the data provided by the light measuring unit 13 whether or not the flash light device 14 must be used when the flash light device 14 is connected to the power supply, and to determine an exposure value and flash control data for the flash photographing mode when the flashlight is necessary or to determine an exposure value for the natural photographing mode.

Figure 9:
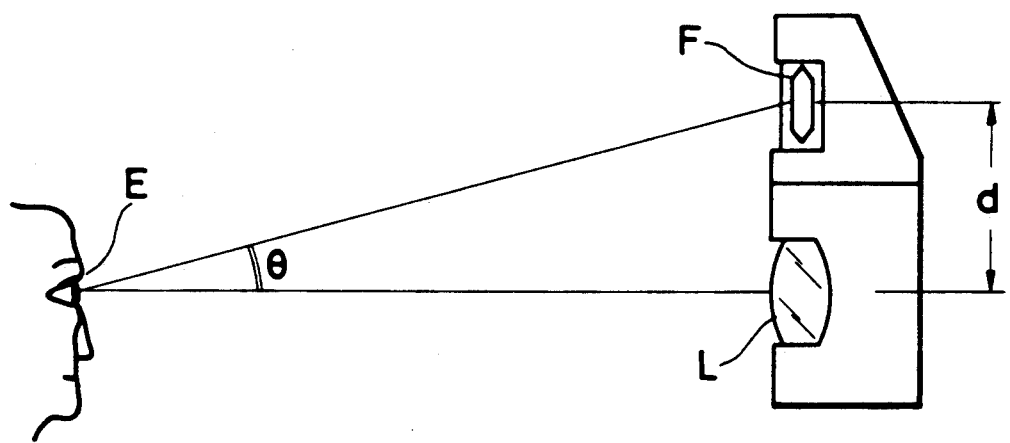
FIG. 9 is an illustration of assistance in explaining a cause of red-eye effect.

In step #6, a query is made to see whether or not the flash photographing mode is selected. When the result in step #6 is negative, namely, when the natural photographing mode is selected, a flag "00" is set in step #13 and the program jumps to step #16. When the result in step #6 is affirmative, the angle θ (FIG. 9) is determined in step #7 from the object distance and the distance between the optical axis of the camera lens 6 and the light source of the flash light device 14. In step #8, the possibility of occurrence of red-eye effect is estimated on the basis of the calculated angle θ, the size of the object (magnification of image) and the brightness of the ambience of the object. The possibility of occurrence of red-eye effect may be estimated with reference to red-eye effect estimation table shown in FIG. 6, which indicates the possibility of occurrence of red-eye effect on the basis of sets of focal length (f) of the camera lens 6 and object distance D. In FIG. 6, sets of focal length of the camera lens 6 and object distance D liable to cause red-eye effect are indicated by circles.

When there is no possibility of occurrence of red-eye effect, a flag "10" is set in step #14 and the program jumps to step #16. When there is the possibility of occurrence of red-eye effect, a warning indicating the possibility of occurrence of red-eye effect is displayed on the display unit 5 in step #9.

When the warning is indicated on the display unit 5, the photographer closes the flash photographing forbidding switch S3. However, since the camera carries out the photographing operation on the basis of exposure control data for flash photographing even if the flash photographing forbidding switch S3 is closed, a film is exposured under appropriate exposure. This underexposure should be compensated in a developing or printing process. In step #10, a query is made to see whether or not the flash photographing forbidding switch S3 is closed. When the result in step #10 is negative, a flag "11" is set and the program jumps to step #16. When the result in step #10 is affirmative, exposure data is calculated again to determine the exposure deficiency in step #11, a flag "01" is set in step #12, and then the program goes to step #16.

In step #11, the aperture value may be calculated again after setting the shutter speed at a lower limit shutter speed at which camera shake will not blur the photograph (generally, a shutter speed is in inverse proportion to a focal length) or a shutter speed higher than the lower limit shutter speed. This procedure reduces the exposure deficiency to the least possible extent, which will be described afterward.

In step #16, a query is made to see whether or not the release switch S2 is closed. When the result in step #16 is negative, the program returns to step #1. When the result in step #16 is affirmative, step #17 and the following steps are executed for exposure operation. In step #17, the previously set flag is tested. When the flag is "00" or "01", step #19 is executed after forbidding flash photographing in step #18. When the flag is "10" or "11", the program jumps to step #19. In step #19, exposure control operation is performed on the basis of the shutter speed and the aperture value calculated in step #5 or corrected in step #11. For flash photographing, the quantity of flashlight is controlled as well in step #19. In steps #20 and #21, the flags are tested. When the flag is "00" or "10" indicating that there is no possibility of red-eye effect, the program jumps directly to step #25 to wind the film. When the flag is "11", namely, when flash photographing is performed under conditions causative of red-eye effect, the program goes to step #25 after recording red-eye effect occurrence signal in the memory 7a of the film cartridge 7. When the flag is "01", namely, when flash photographing is forbidden to prevent red-eye effect, a flash photographing forbiddance signal is recorded in the memory 7a in step #22, exposure deficiency data is recorded in step #23, and then the program goes to step #25.

Figure 5:
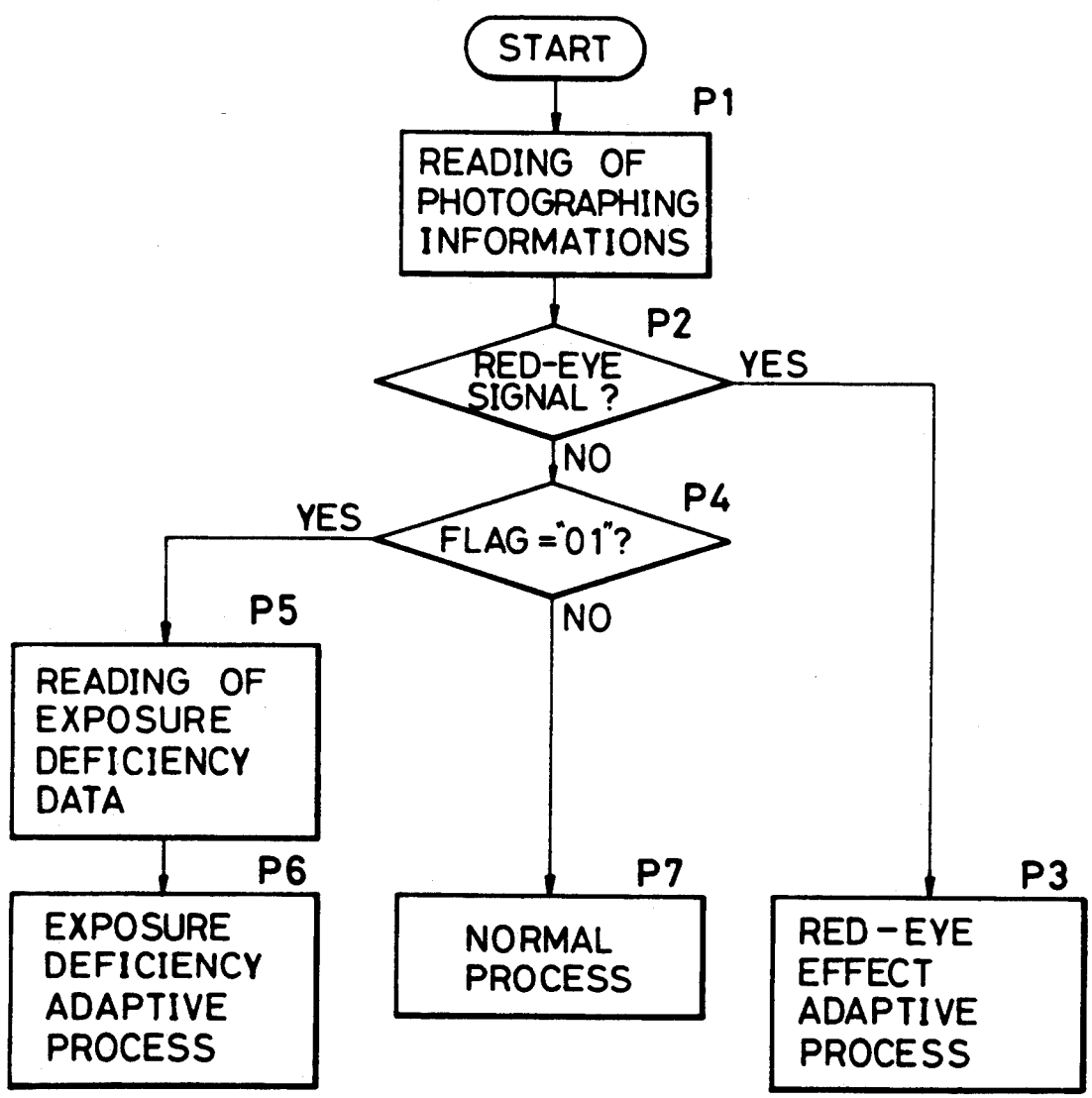
FIG. 5 is a flow chart of assistance in explaining a film processing process based on information recorded in a memory.

FIG. 5 shows procedure for processing a film contained in the film cartridge 7 at a processing laboratory.

In step P1, recorded photographing information is read from the memory 7a. When red-eye effect occurrence signal is recorded in the memory 7a (the flag is "11"), the film is subjected to red-eye effect adaptive process (steps P2 and P3). Concretely, red eyes in the negative are found by an image processing method and the red eyes are retouched for printing. When the flash photographing forbiddance signal is recorded, namely, when the flag is "01", the exposure deficiency data is read from the memory 7a and the film is subjected to an exposure deficiency adaptive process (steps P4, P5 and P6). Concretely, the film is processed by a high-speed development process, or the picture is printed at an enhanced print exposure. When neither the flash photographing forbiddance signal nor the exposure deficiency data is recorded in the memory 7a, the film is subjected to a normal process (steps P4 and P7).

In red-eye effect estimation table shown in FIG. 6, focal lengths (f) of the camera lens 6 are indicated on a top line, object distances D are indicated on a leftmost row, and sets of focal length (f) of the camera lens 6 and object distance D liable to cause red-eye effect are indicated by circles. When the object distance D is not greater than 1 m, red-eye effect does not occur provided that the distance between the optical axis of the camera lens and the light source of the flash light device is on the order of 60 mm, because the angle $\theta$ between a line connecting the light source of the flash light device and the object, and a line connecting the camera lens and the object is greater than 2.5°. When (f)=35 mm and D≧4 m, (f)=50 mm and D≧5.6 m, and (f)=70 mm and D=8 m, it is regarded as that red-eye effect does not occur because the small image of the object makes red eyes inconspicuous. This table was produced on the basis of experimental results that red eyes are inconspicuous when the magnification of image is greater than 1/100.

FIG. 7 shows another red-eye effect estimation table for a camera provided with a pop-up flash light device capable of changing its distance from the optical axis of the camera lens between 60 mm and 70 mm. The contents of the red-eye effect estimation table shown in FIG. 7 are similar to those of the red-eye effect estimation table shown in FIG. 6. When the distance (d) between the optical axis of the camera lens and the light source of the flash light device is increased to 70 mm, red-eye effect does not occur even when D=1.4 m and (f)=70 mm or 105 mm because the angle $\theta$ is large.

In this embodiment, the memory 7a of the film cartridge 7 is supposed to be an IC memory, but the memory 7a may be any suitable readable/writable memory means, such as a magnetic memory.

The flash photographing forbidding switch S3 employed in this embodiment is supposed to be a manual switch, but the same may be an automatic switch capable of closing automatically in response to red-eye effect occurrence signal. When such an automatic switch is employed, flash photographing is forbidden automatically under photographing conditions causative of red-eye effect and a manual switch could be provided for interrupting the automatic flash forbiddance.

Figure 4:
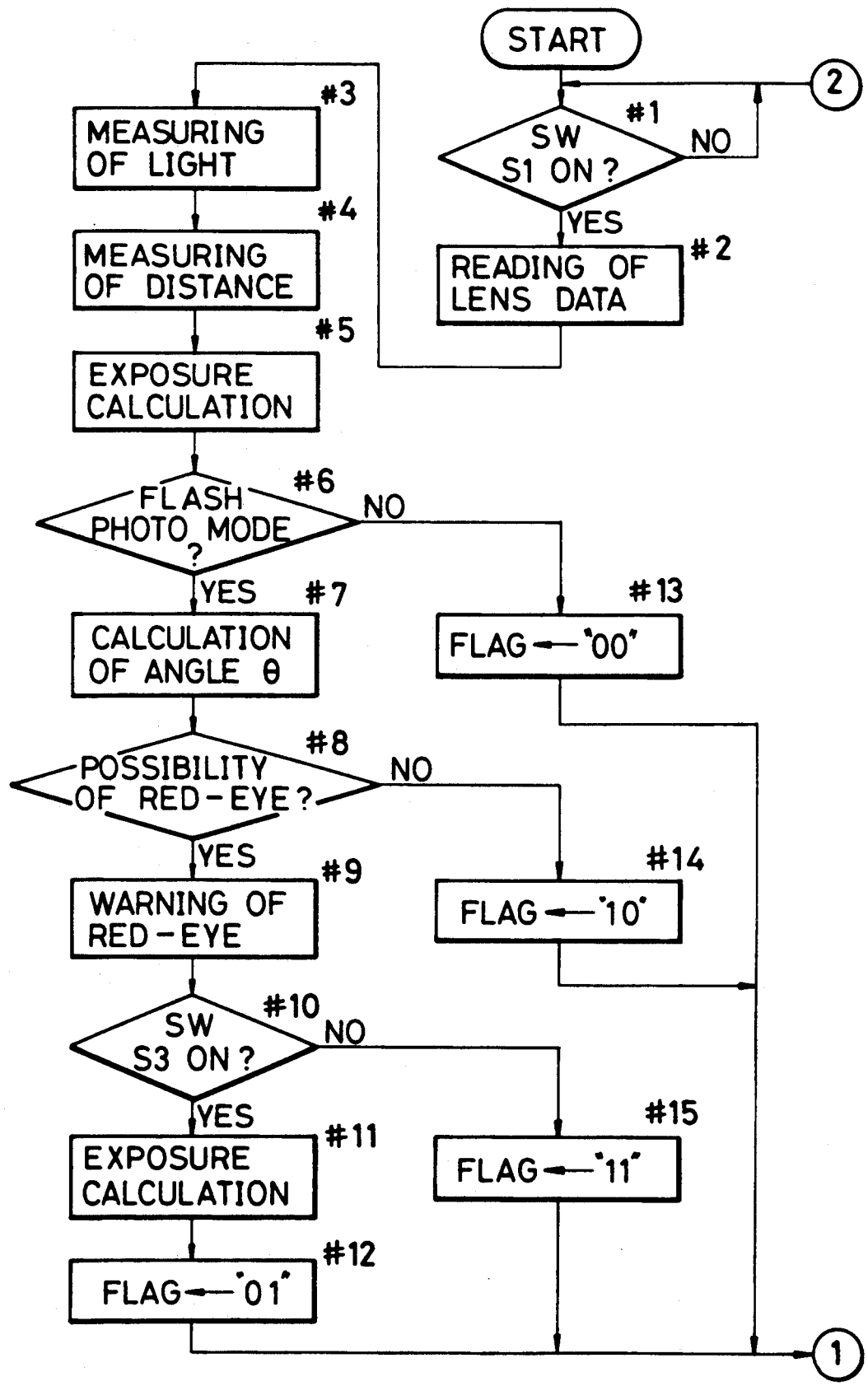
FIGS. 4(a) and 4(b) are flow charts of a program to be executed by the control circuit of FIG. 3.
Figure 4:
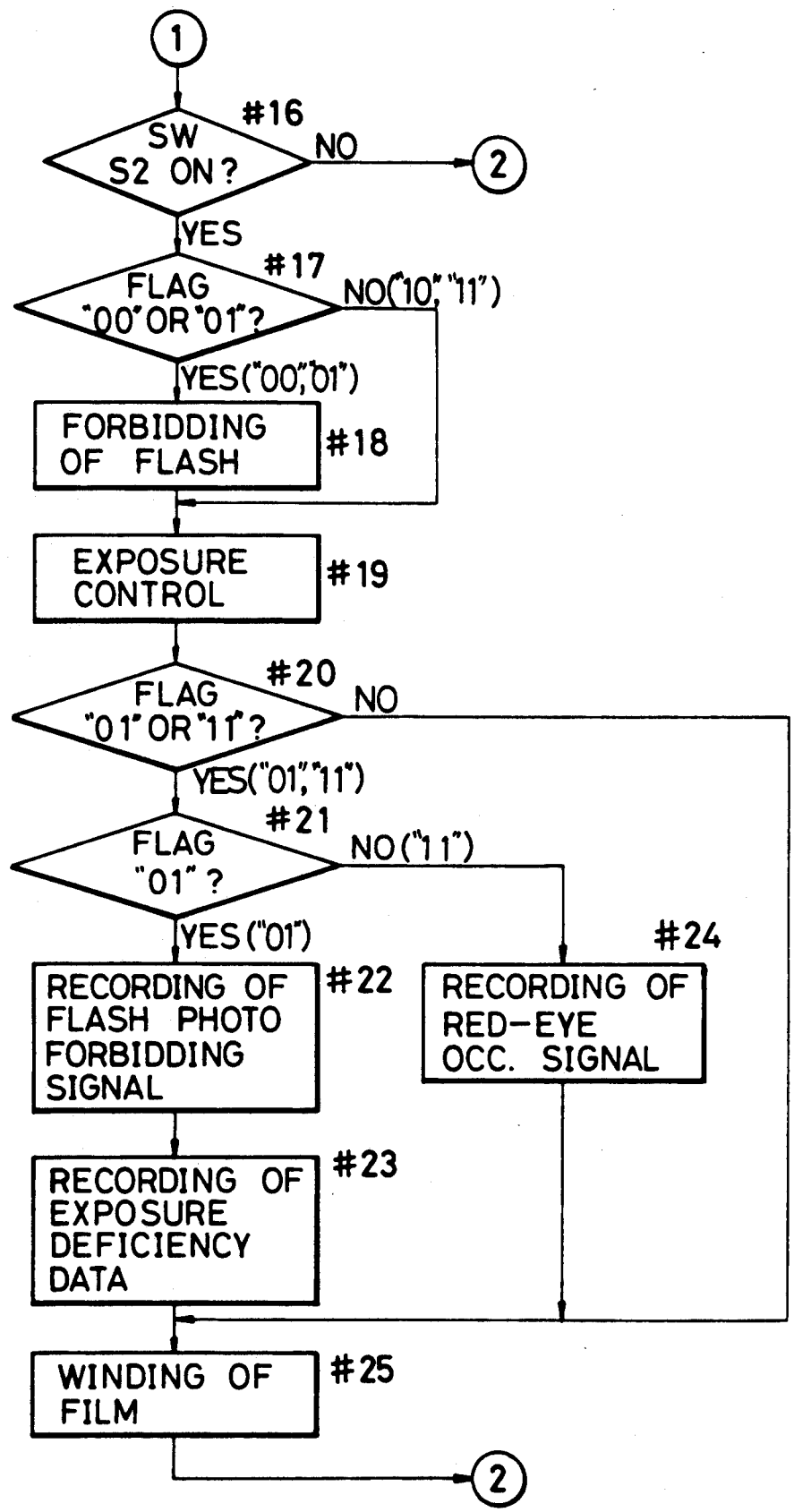
Figure 8:
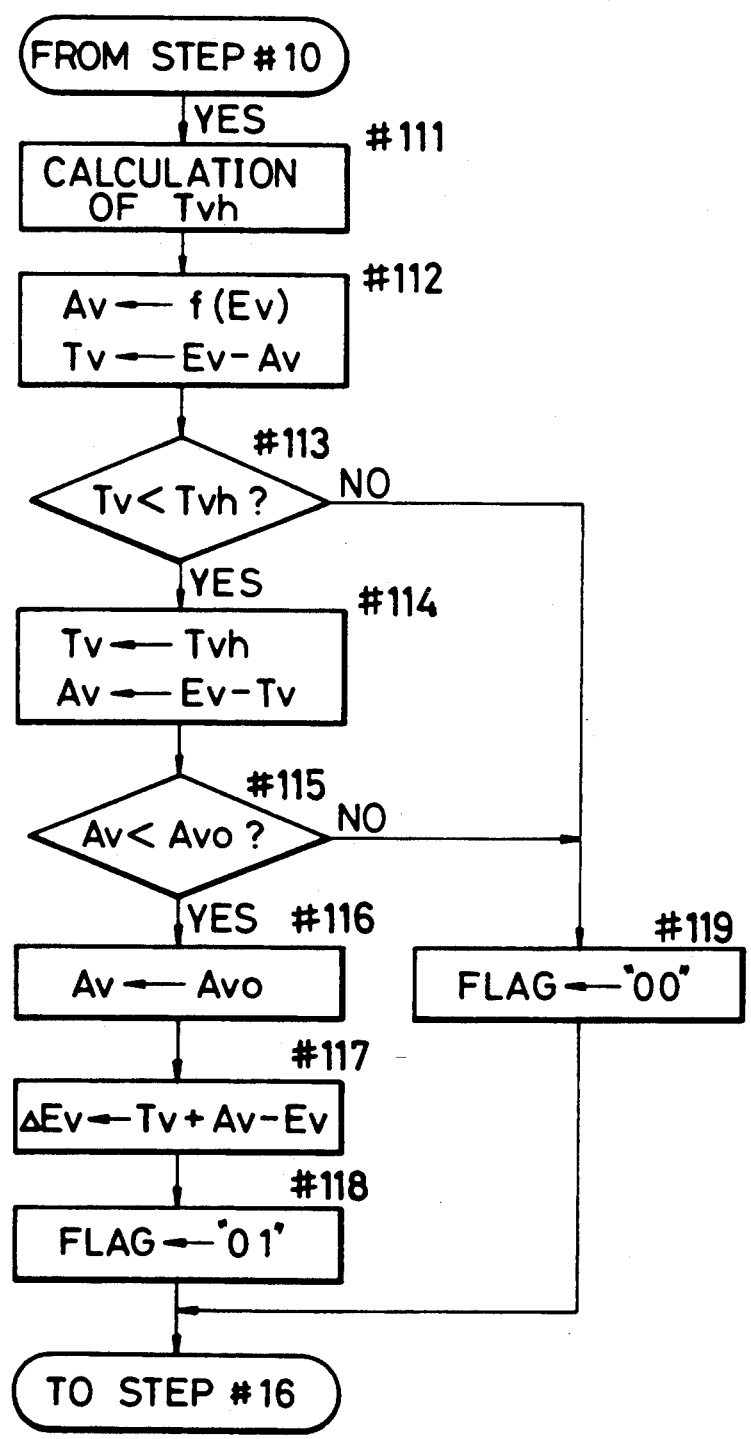
FIG. 8 is a flow chart of a modification of the exposure calculation procedure.

FIG. 8 shows a flow chart of a modification of the exposure calculating procedure of steps #11 and #12 in the program shown in FIG. 4(a). The exposure calculating procedure shown in FIG. 8 reduces exposure deficiency to the least possible extent.

Referring to FIG. 8, a lower limit shutter speed Tvh, namely, a shutter speed below which camera shake will blur the photograph, is determined in step #111 on the basis of the data of the focal length of the camera lens given in step #2 (FIG. 4(a)). In step #112, an aperture value Av included in the range of apertures for the coupled diaphragm is determined on the basis of an exposure value Ev for appropriate exposure, which is dependent on data Bv provided by the light measuring unit 13 in step #3 and the sensitivity Sv of the film, and a shutter speed Tv suitably combined with the aperture value Av for correct exposure is determined. Steps #111 and #112 correspond to step #5 (FIG. 4(a)) for a natural photographing mode. In step #113, a query is made to see whether or not the shutter speed Tv is lower than the lower limit shutter speed Tvh, i.e., Tv < Tvh. When Tv < Tvh, the shutter speed Tv is set to the lower limit shutter speed Tvh, and an aperture value Av(=Ev−Tv) for correct exposure at the shutter speed Tvh is determined in step #114. In step #115, a query is made to see whether or not the aperture value Av determined in step #114 is smaller than the open aperture value $Av_0$, which is given in step #2. When the result in step #115 is affirmative (Av < $Av_0$), the aperture value Av is set to $Av_0$ in step #116. In step #117, an exposure deficiency $_{66}$Ev(=Tv+Av−Ev) in photographing at the lower limit shutter speed Tvh and the open aperture value $Av_0$ is determined, the flag is set to "01" in step #118, and then the program goes to step #16 (FIG. 4(b)).

When the result in step #113 is negative, namely, when Tv ≧ Tvh and the photograph will not be blurred by camera shake when the shutter is operated at the shutter speed Tv determined in step #112, or when the result in step #115 is negative, namely, when Av ≧ $Av_0$, the program goes to step #119 because correct exposure is possible without flashlight. In step #119, the flag is set to "00", and then the program goes to step #16 (FIG. 4(b)).

The aperture value Av determined in step #114 is smaller than the maximum aperture value $Av_m$ of the camera lens, namely, an aperture for the minimum effective diameter of the camera lens; that is, the shutter speed $Tv_1$ determined in step #112 is lower than the shutter speed $Tv_2$ determined in step #114 ($Tv_1 < Tv_2$). Accordingly, the aperture value $Av_1$ determined in step #112 is greater than the aperture value $Av_2$ determined in step #114 ($Av_1 > Av_2$, because $Av_1 + Tv_1 = Av_2 + Tv_2 = Ev$.) As mentioned above, the aperture value $Av_1$ determined in step #112 is not greater than the maximum aperture value $Av_m$, and hence $Av_2 < Av_1 ≧ Av_m$.

Thus, in step #115, a query is made only to see whether or not the aperture value Av determined in step #114 is smaller than the open aperture value $Av_0$.

The idea on which the present invention is based is applicable not only to preventing red-eye effect, but is applicable to other purposes. For example, the present invention is optimum for photographing combined with a high speed development processing. The high speed development processing is used often when it is impossible to photograph a moving object, such as a sports player in performance, at a desired high shutter speed because of the camera lens having a small open aperture or when the smallest possible aperture is desirable. For example, suppose that the (F) number of the open aperture of the camera lens is F4 ($Av_0$=4), the photographic sensitivity of the film is ISO 400 (Sv=7), and the object brightness Bv=6. Then, the highest possible shutter speed Tv is:

$$Tv = Bv + Sv - Av_0 = 6 + 7 - 4 = 9$$

Therefore, Tv=1/500 sec; that is, correct exposure is impossible when the shutter speed to be used is higher than 1/500, such as 1/1000. When a film of ISO 800 (Sv=8) in photographic sensitivity is gained by a high speed sensitized development processing, correct exposure is possible at a shutter speed of 1/1000 sec (Tv=10).

When photographing with the camera of the present invention combined with the high speed development processing, steps #6 to #15, #17, #18, #20 to #22 and #24 (FIGS. 4(a) and 4(b)) are omitted, and an exposure deficiency is determined in step #5 and the exposure deficiency is recorded in the memory 7a of the film cartridge 7 in step #23.

It has been necessary in sending an exposed film to a processing laboratory to give notice of the film being processed by the high speed development processing, but the present invention enables the automatic identification of the exposure deficiency and an appropriate processing for the exposure deficiency (FIG. 5).

According to the present invention, an amount of overexposure is determined and recorded in the memory 7a of the film cartridge 7 in case of overexposure which is unavoidable even if an object is photographed at the smallest aperture and at the highest shutter speed because the subject brightness is excessively high. A satisfactory picture can be printed by adjusting printing conditions, such as print exposure, based on the information recorded in the memory 7a in a printing process.

As is apparent from the foregoing description, according to the present invention, the possibility of occurrence of red-eye effect is recognized from set photographing conditions and film processing information is recorded in an external memory. Therefore, an underexposed film obtained by exposing without using flashlight to avoid red-eye effect can satisfactorily be developed by high-speed development or increased print exposure according to the information recorded in the external memory. When the flash light device is used regardless of unavoidable red-eye effect, red eyes can be corrected by processing the red eyes according to the film processing information recorded in the external memory to print a satisfactory picture. When photographing conditions are liable to cause red-eye effect, a warning is displayed to warn the photographer of the possibility of occurrence of red-eye effect when the flash light device is used.

What is claimed is:

1. A camera system including a camera body and a flash light device, comprising:
   means for judging whether or not a red-eye effect will occur when said flash light device is fired at a photographing operation of said camera system, to produce a red-eye signal when the possibility of occurrence of the red-eye effect is judged;
   external memory means detachably mounted on said camera body, for storing a plurality kinds of photographing conditions; and
   means for writing information representative of the possibility of occurrence of the red-eye effect in said external memory means in accordance with said red-eye signal.

2. A camera system including a camera body and a flash light device, comprising:
   means for judging whether or not a red-eye effect will occur when said flash light device is fired at a photographing operation of said camera system, to produce a first signal when the possibility of occurrence of the red-eye effect is judged;
   means for determining whether or not said flash light device will be fired at the photographing operation;
   means for discriminating that said determining means determines said flash light device will be fired at the photographing operation to produce a second signal;
   means for generating a third signal in accordance with both of said first and second signals;
   external memory means, detachably mounted on said camera body, for storing a plurality kinds of photographing conditions; and
   means for writing a predetermined information in said external memory means in accordance with said third signal.

3. A camera system including a camera body and a flash light device, comprising:
   means for judging whether or not a red-eye effect will occur when said flash light device is fired at a photographing operation of said camera system, to produce a first signal when the possibility of occurrence of the red-eye effect is judged;
   means for determining whether or not said flash light device will be fired at the photographing operation;
   means for discriminating that said determining means determines said flash light device will not be fired at the photographing operation to produce a second signal;
   means for generating a third signal in accordance with both of said first and second signals;
   external memory means, detachably mounted on said camera body, for storing a plurality kinds of photographing conditions; and
   means for writing a predetermined information in said external memory means in accordance with said third signal.

4. A camera system as claimed in claim 3, further comprising,
   means for calculating a proper exposure value for a condition when said flash light device is fired at the photographing operation, and means for correcting the calculated exposure value in response to said third signal.

5. A camera system as claimed in claim 4, further comprising, means for calculating a difference between the calculated exposure value and the corrected exposure value, and wherein said writing means includes means for writing an information representative of said calculated difference in said external memory means in accordance with said third signal.

6. A camera system including a camera body and a flash light device, comprising:
   means for judging whether or not a red-eye effect will occur when said flash light device is fired at a photographing operation of said camera system, to produce a red-eye signal when the possibility of occurrence of the red-eye effect is judged; and
   means for inhibiting a flash light emission of said flash light device in response to said red-eye signal.

* * * * *